(12) United States Patent
Nakae

(10) Patent No.: US 7,512,041 B2
(45) Date of Patent: Mar. 31, 2009

(54) INFORMATION RECORDING/REPRODUCING APPARATUS THAT AUTOMATICALLY STORES INFORMATION DATA BEFORE EJECTING A RECORDING MEDIUM

(75) Inventor: Satoru Nakae, Hyogo (JP)

(73) Assignee: Fujitsu Ten Limited, Hyogo (JP)

( * ) Notice: Subject to any disclaimer, the term of this patent is extended or adjusted under 35 U.S.C. 154(b) by 700 days.

(21) Appl. No.: 10/963,568

(22) Filed: Oct. 14, 2004

(65) Prior Publication Data

US 2005/0111329 A1 May 26, 2005

(30) Foreign Application Priority Data

Oct. 15, 2003 (JP) ............................ P2003-355511

(51) Int. Cl.
*G11B 21/08* (2006.01)
(52) U.S. Cl. ........................................ 369/30.24; 369/7
(58) Field of Classification Search ................... 369/6, 369/7, 30.23, 30.24, 47.32–47.34
See application file for complete search history.

(56) References Cited

U.S. PATENT DOCUMENTS

| 5,621,712 | A | * | 4/1997 | Nonaka | ................. | 369/124.14 |
| 6,041,023 | A | * | 3/2000 | Lakhansingh | .................. | 369/7 |
| 6,172,948 | B1 | * | 1/2001 | Keller et al. | .................. | 369/83 |
| 6,388,961 | B1 | * | 5/2002 | Ijichi | ....................... | 369/30.36 |
| 6,587,404 | B1 | * | 7/2003 | Keller et al. | ............. | 369/30.06 |
| 7,113,456 | B2 | * | 9/2006 | Kusano et al. | ........... | 369/30.09 |

FOREIGN PATENT DOCUMENTS

| JP | A 7-325671 | 12/1995 |
| JP | A-11-288577 | 10/1999 |
| JP | A 2000-207845 | 7/2000 |
| JP | A-2001-52421 | 2/2001 |
| JP | A-2001-229606 | 8/2001 |
| JP | A 2001-229609 | 8/2001 |
| JP | A 2001-351325 | 12/2001 |
| JP | A-2001-357609 | 12/2001 |
| JP | A 2003-85881 | 3/2003 |
| JP | U-3095552 | 5/2003 |

* cited by examiner

*Primary Examiner*—Tan X Dinh
(74) *Attorney, Agent, or Firm*—Oliff & Berridge, PLC

(57) ABSTRACT

An information recording/reproducing apparatus includes a reproduction unit, an operation unit, a storage unit, and a control unit. The reproduction unit reads information recorded in a recording medium. The operation unit instructs the reproduction unit to eject the recording medium. The storage unit stores the information read by there production unit therein. When the recording medium is loaded into the reproduction unit, the control unit controls the reproduction unit to read the information and controls the storage unit to store the information read by there production unit therein automatically. When the operation unit instructs the reproduction unit to eject the recording medium during the storage unit being storing the information read, the control unit informs a user that the storage unit is storing the information read.

21 Claims, 4 Drawing Sheets

FIG. 4

Now recording

Remaining: xx Minutes xx Seconds

Recording completed song number: No. xx

Recording interrupted? [Yes] [No]

FIG. 5

Sound skipped.

Recording interrupted?

[Yes] [No]

INFORMATION RECORDING/REPRODUCING APPARATUS THAT AUTOMATICALLY STORES INFORMATION DATA BEFORE EJECTING A RECORDING MEDIUM

BACKGROUND OF THE INVENTION

1. Field of the Invention

The present invention relates to an information recording/reproducing apparatus, and more particularly to an audio apparatus for automatically reproducing or playing back music and automatically recording the music reproduced in a storage device when an information recording medium storing music information recorded is loaded into a reproducing device for reproducing it.

2. Description of the Related Art

An audio apparatus such as an in-vehicle audio apparatus has a storage-medium reproducing device such as a CD player, so that a user can enjoy the music reproduced or played back by the reproducing device. The audio apparatus also has a hard disk (hereinafter referred to as HD) with a large capacity of e.g. several tens G (giga) bytes and a hard disk drive (HDD) for driving HD, so that the user can enjoy any selected music program reproduced by a music reproducing system from the HD in which a large number of recording media such as CDs are copied (see JP-A-2000-207845).

According to such an audio apparatus, if contents of a large number of recording media, e.g. CD have been previously recorded in a built-in HD, a preferred piece of music read from among programmed pieces of music contained in a large number of CDs can be enjoyed with no loading/unloading thereof. Particularly, from the viewpoint of safety driving, this is preferred in an in-vehicle audio apparatus, which is mostly operated during driving because copying in HD makes it unnecessary to load/unload a recording medium such as CD.

In this way, in the in-vehicle apparatus, contents of a large number of CDs are often used in a form recorded in a storage device such as HD. Some audio apparatus, therefore, have been also proposed in which the reproducing/recording of CD is automatically started when CD is loaded into a reproducing device.

SUMMARY OF THE INVENTION

When the recording/reproducing of the recording medium is automatically started when the recording medium is loaded into the reproducing device, audio of the recording medium is not output from a reproducing system. For this reason, a user may forget recording and eject the recording medium. This gives rise to a problem that the recording medium will be ejected without completing recording.

Further, in the case of the audio apparatus appended to a car navigation device, when the operation/display panel of the car navigation device is opened, the recording medium such as CD is ejected. Therefore, when the user forgets that recording is being automatically performed and opens the operation display panel, a problem likewise occurs that the recording medium will be ejected without completing the recording.

Further, if music is not output from the recording system during automated recording as described above, the user does not notice that sound skip has occurred. Therefore recording will be completed in sound-skipped state. In this case, it is possible to detect the sound-skip and automatically perform re-recording. This, however, leads to a problem that the recording time will be lengthened without the user's noticing.

Another problem will occur in the automated recording that if the user is not seeing the display panel, he/she cannot know when the recording has been completed.

Further, it is also possible to output music being reproduced during the automated recording. However, the user, who often records content of a recording medium such as CD into a built-in HD in advance and enjoys his/her preferable programmed music from the built-in HD, may carry out automated recording while he/she listens to broadcasting from a tuner. In such a case, simultaneously when the recording operation is started, the recording medium is reproduced and the reproduced audio is produced. After completion of the recording, therefore, it is necessary for a user to return the source of audio output from a speaker to the state where the recording medium has been loaded. This is very troublesome.

The invention has been made in view of the problems described above. An object of the invention is to provide an information recording/reproducing apparatus capable of preventing a recording medium from being ejected during automated recording of the recording medium and saving a user's labor during the automated recording.

In order to achieve the above-described object, an information recording/reproducing apparatus (1) includes a reproduction unit, an operation unit, a storage unit, and a control unit. The reproduction unit reads information recorded in a recording medium. The operation unit instructs the reproduction unit to eject the recording medium. The storage unit stores the information read by the reproduction unit therein. When the recording medium is loaded into the reproduction unit, the control unit controls the reproduction unit to read the information and controls the storage unit to store the information read by the reproduction unit therein automatically. When the operation unit instructs the reproduction unit to eject the recording medium during the storage unit being storing the information read, the control unit informs a user that the storage unit is storing the information read.

In addition to (1), in an information recording/reproducing apparatus (2), when the operation unit instructs the reproduction unit to eject the recording medium during the storage unit being storing the information read, the control unit displays time to storage completion on a display.

In addition to (1), in an information recording/reproducing apparatus (3), when the operation unit instructs the reproduction unit to eject the recording medium during the storage unit being storing the information read, the control unit displays attribute information of the information, which has been stored in the storage unit, on a display.

An information recording/reproducing apparatus (4) includes an operation/display panel, a reproduction unit, a storage unit, and a control unit. A recording medium is lodable into the reproduction unit, when the operation/display panel is opened. The reproduction unit reads information recorded in the recording medium. The storage unit stores the information read by the reproduction unit. When the recording medium is loaded into the reproduction unit, the control unit controls there production unit to read the information and controls the storage unit to store the information read therein automatically. When an opening operation of the operation/display panel is performed during the storage unit being storing the information read, the control unit informs a user that the storage unit is storing the information read.

In addition to (4), in an information recording/reproducing apparatus (5), when the opening operation of the operation/display panel is performed during the storage unit being storing the information read, the control unit displays time to storage completion on a display.

In addition to (4), in an information recording/reproducing apparatus (6), when the opening operation of the operation/display panel is performed during the storage unit being storing the information read, the control unit displays attribute information of the information, which has been stored in the storage unit, on a display.

In addition to any one of (1)-(6), in an information recording/reproducing apparatus (7), when the storage unit completes the storing of the information read, the control unit ejects the recording medium from the reproduction unit automatically.

In addition to any one of (1)-(6), in an information recording/reproducing apparatus (8), when an error occurs during the storage unit being storing the information read, the control unit notifies the occurrence of the error.

An information recording/reproducing apparatus (9) includes a reproduction unit, a storage unit, an audio output unit, a control unit, and a reception unit. The reproduction unit reads information recoded in a recording medium. The storage unit stores the information read by the reproduction unit therein. The audio output unit outputs audio. The reception unit receives external information from external. When the recording medium is loaded into the reproduction unit, the control unit controls the reproduction unit to read the information and controls the storage unit to store the information read therein automatically. The audio output unit is able to output the external information received. When the recording medium is loaded into the reproduction unit and the audio output unit outputs audio other than the information recorded in the recording medium, the control unit controls the storage unit to begin storing the information read without changing the audio output from the audio output unit.

An information recording/reproducing apparatus (10) includes a reproduction unit, a storage unit, an audio output unit, a control unit, a reception unit, and a selection unit. The reproduction unit reads information recorded in a recording medium. The storage unit stores the information read by the reproduction unit therein. The audio output unit outputs audio. The reception unit receives external information from external. When the recording medium is loaded into the reproduction unit, the control unit controls the reproduction unit to read the information and controls the storage unit to store the information read therein automatically. The audio output unit is able to output the external information received. The selection unit selects one of: (a) a first mode in which when the recording medium is loaded into the reproduction unit and the audio output unit outputs audio other than the information recorded in the recording medium, the control unit controls the storage unit to begin storing the information read without changing the audio output from the audio output unit; and (b) a second mode in which when the recording medium is loaded into the reproduction unit and the audio output unit outputs audio other than the information recorded in the recording medium, the control unit changes the audio output from the audio output unit to the information read.

According to the information recording/reproducing apparatus (1), when the operation unit instructs the reproduction unit to eject the recording medium during the storage unit being storing the information read, the control unit informs a user that the storage unit is storing the information read. Therefore, even if a user erroneously performs the operation of ejecting the recording medium, the user recognizes that the information is being stored, thereby continuing the storage. For example, if the user sees a display during the automated recording, it can be prevented that the user erroneously instructs to eject the recording medium.

According to the information recording/reproducing apparatus (2) or (3), when the operation unit instructs the reproduction unit to eject the recording medium during the storage unit being storing the information read, the control unit displays time to storage completion or attribute information of the information, which has been stored in the storage unit, on a display. Therefore, a user can know the remaining time until completion of the storage at that time or e.g. song names of music storage-completed.

According to the information recording/reproducing apparatus (4) to (6), likewise as described above, when an opening operation of the operation/display panel is performed during the storage unit being storing the information read, the control unit: informs a user that the storage unit is storing the information read; displays time to storage completion on the display; or displays attribute information of the information, which has been stored in the storage unit, on the display. Therefore, even if a user erroneously performs the operation of opening the operation/display panel, the user can recognize that the information is being stored and know e.g. song names of the music storage-completed at that time.

According to the information recording/reproducing apparatus (7), when the storage unit completes the storing of the information read, the control unit ejects the recording medium from the reproduction unit automatically. This saves the labor of the operation by the user.

According to the information recording/reproducing apparatus (8), when an error occurs during the storage unit being storing the information read, the control unit notifies the occurrence of the error. Therefore, the user can select whether the storage should be interrupted or the storage should be continued.

According to the information recording/reproducing apparatus (9), when the recording medium is loaded into the reproduction unit and the audio output unit outputs audio other than the information recorded in the recording medium, the control unit controls the storage unit to begin storing the information read without changing the audio output from the audio output unit. Therefore, for example, even when the storage is performed while the user listens to broadcasting from a tuner, the user can continuously listen the broadcasting of the tuner without performing the operation of changing the audio output.

According to the information recording/reproducing apparatus (10), the selection unit selects one of: (a) a first mode in which when the recording medium is loaded into the reproduction unit and the audio output unit outputs audio other than the information recorded in the recording medium, the control unit controls the storage unit to begin storing the information read without changing the audio output from the audio output unit; and (b) a second mode in which when the recording medium is loaded into the reproduction unit and the audio output unit outputs audio other than the information recorded in the recording medium, the control unit changes the audio output from the audio output unit to the information read. Therefore, the audio to be output during the storage can be previously set according to a user's request, so that the operation during the storage can be simplified.

BRIEF DESCRIPTION OF THE DRAWINGS

FIG. 4 is a view showing an example of display of recording not-completed.

FIG. 5 is a view showing an example of display of occurrence of sound skip.

DETAILED DESCRIPTION OF THE PREFERRED EMBODIMENT

Figure 1:
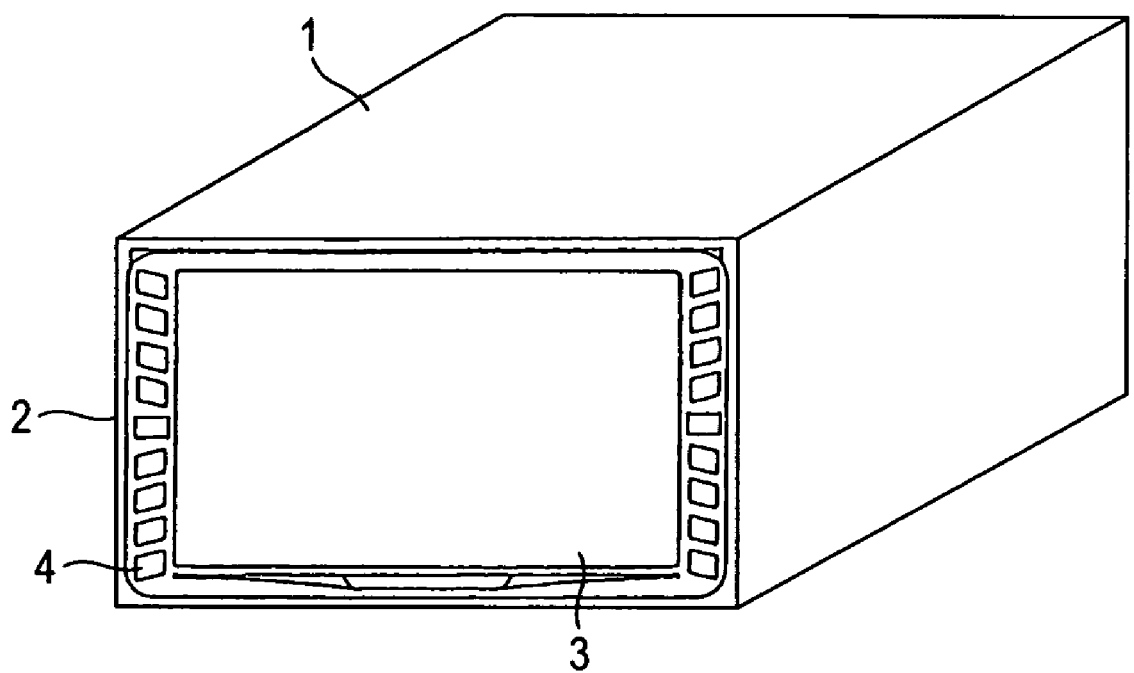
FIG. 1 is an appearance view of a car navigation device according to an embodiment of the invention.

Now referring to the drawings, an explanation will be given on an audio apparatus according to the invention with taking an embodiment where the invention is applied to a car navigation device. FIG. 1 is an appearance view of the car navigation device. As seen from FIG. 1, an operation/display panel 2 is provided on the front face of an device body 1. At the center of the operation/display panel 2, an LCD display portion is arranged. On the periphery thereof, plural operation keys 4 are provided.

When opening the operation/display panel 2 is designated through the pertinent operation key 4 or a touch panel of the LCD display portion 3, the operation/display panel 2 descends with rotating. Then, a recording medium insertion portion (not shown) of a CD player or MD player appears so that the recording medium can be inserted thereinto.

Figure 2:
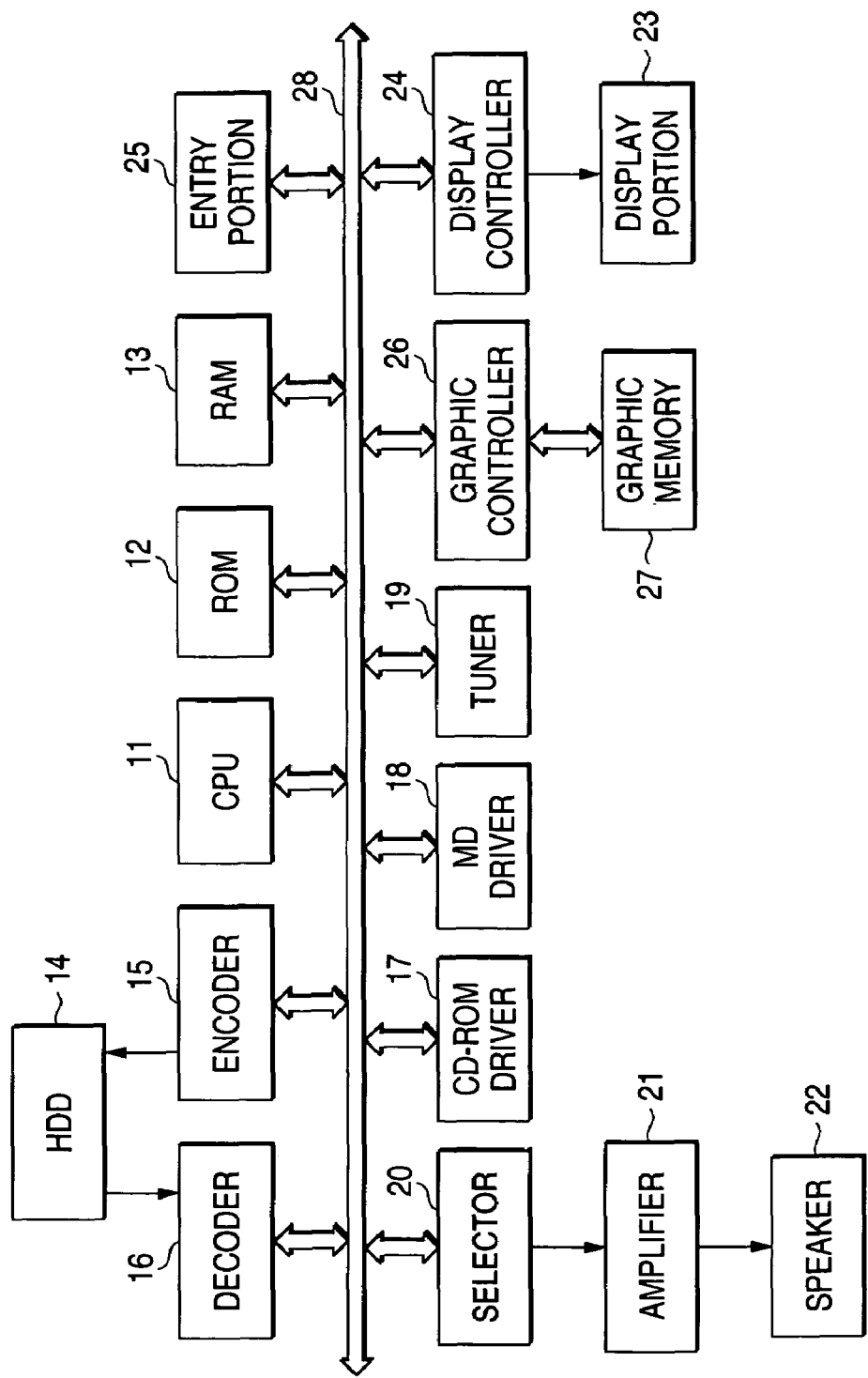
FIG. 2 is a schematic diagram showing the configuration of a control system of the car navigation device.

FIG. 2 is a schematic diagram showing the configuration of a control system of the car navigation device. In FIG. 2, only audio-related portions are shown. As seen from FIG. 2, the audio-related portions of the car navigation device include a CPU 11, a ROM (Read Only Memory) 12, a RAM (Random Access Memory) 13, a HDD 14, an encoder 15, a decoder 16, a CD-ROM drive 17, an MD drive 18, a tuner 19, a selector 20, an amplifier (AMP) 21, a speaker 22, a display portion 23, a display controller 24, an entry portion 25, a graphic controller 26 and a graphic memory 27. These elements are connected to one another through a bus 28.

The CPU 11 controls the respective hardware portions of the car navigation device through the bus 28 and executes various programs on the basis of programs stored in the ROM 12. The ROM 12 previously stores the various programs necessary for the operation of the car navigation device. The RAM 13 may be e.g. an SRAM, which stores temporary data generated during execution of the programs.

The HDD 14 drives HD that is a storage medium for storing music recorded in a recording medium such as CD. The encoder 15 compresses a signal supplied from the recording medium such as CD, and the compressed signal is stored in the HD. The decoder 16 decodes the signal read from the HD, and then the decoded signal is output. Further, the CD-ROM drive 17/MD drive 18 reproduces and outputs music information recorded in the CD/MD. The tuner 19 receives and outputs audio broadcasting such as FM, AM and a television broadcasting. The selector 20 selects audio to be output from the speaker 22. Under the control by the CPU 11, the selector 20 selects one of: (a) read-output of the HDD 14; (b) output of the CD-ROM drive 17; (c) output of the MD drive 18; and (d) output of the tuner 19 to output the selected one to the AMP 21. Then, the selected audio is output from the speaker 22.

The display portion 23 displays a map, the operating status of the car navigation device, or operation screens for various functions. The display portion 23 includes a large-scale LCD display portion (large-sized display screen) 3 provided on the operation/display panel 2 shown in FIG. 1, and is controlled by the display controller 24. A touch panel switch is provided on the LCD display portion 3. When an item segment displayed on the LCD display portion 3 is depressed, the corresponding item can be selected or the corresponding function can be executed. The entry portion 25 includes the operation keys 4 provided on the operation/display panel 2 and the touch panel on the LCD display portion 3.

The CPU 11 controls the graphic controller 26. The graphic controller 26 reads out content displayed on the display portion 23 from the graphic memory 27, and sends the contents read to the display controller 24.

The audio apparatus of this car navigation device has an automated recording function that when a CD is loaded in the CD-ROM drive 17, the CD is automatically reproduced and the reproduced output is automatically stored in the HD by the HDD 14 through the encoder 15. Further, the audio apparatus is configured so that an operation mode of the output produced from the speaker 22 during the automated recording can be set. Specifically, the audio apparatus can select: mode 1 in which the automated recording is started without changing audio being output from the speaker 22 at the time of loading CD, e.g. broadcast output from the tuner 19; or mode 2 in which the automated recording is started with changing audio being output from the speaker 22 to the reproduction output of the CD-ROM drive 17. At the time of the mode selection, a user makes the LCD display portion 3 display a menu thereon and select audio output mode setting with using the operation keys 4. By depressing "mode 1" or "mode 2" displayed on the screen of the audio output mode setting at the LCD display portion 3, either mode can be set. The output operation mode set by a user can be stored in the RAM 13.

Figure 3:
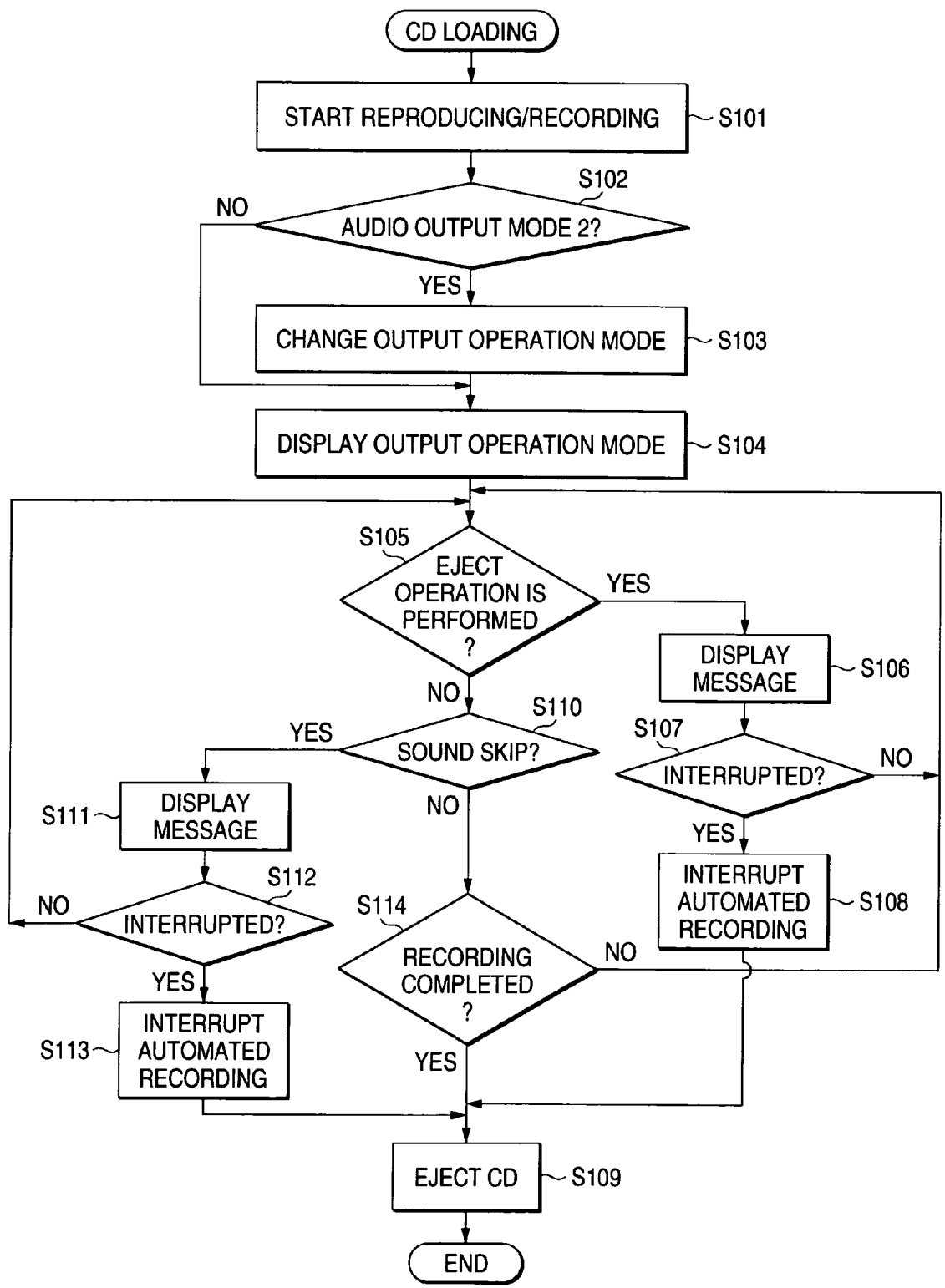
FIG. 3 is a flowchart showing an operation when music information recorded in CD is automatically recorded in HD.

Referring to the flowchart of FIG. 3, an explanation will be given on an operation when music information recorded in CD is automatically recorded in the HD. Incidentally, this operation is performed under the control of the CPU 11 on the basis of the program stored in the ROM 12.

In the case of automated recording, when a user designates the opening of the operation/display panel 2 from the operation keys 4 or touch panel on the LCD display portion 3, the operation/display panel 2 descends with rotating. Then, the recording medium insertion portion of the CD-ROM drive 17/the MD drive 18 appears. In this state, when a user loads CD in CD loading portion (the recording medium insertion portion) of the CD-ROM drive 17, the CPU 11 initiates a program shown in the flowchart of FIG. 3.

When CD is loaded, the CPU 11 closes the operation/display panel 2 and thereafter starts the reproduction of the CD by the CD-ROM drive 17. The music information reproduced by the CD-ROM drive 17 is automatically recorded in the HD by the HDD 14 through the encoder 15 (step 101). Next, the CPU 11 determines whether or not the audio output mode (output operation mode), which is set by a user and stored in the RAM 13, is the mode 2 (step 102). If the audio output mode is the mode 1, audio being output from the speaker 22 at this time, e.g. broadcast output from the tuner 19 is continuously output as it is. On the other hand, if the audio output mode (output operation mode) set by the user is the mode 2, the CPU 11 reproduces the music information recorded in the HD by the HDD 14 and also controls the selector 20 so that the output from the selector 20 is changed into the output from the decoder 16 (Step 103). Thus, the music information is automatically recorded in the HD and simultaneously, the music information stored therein is read and supplied to the speaker 22 through the decoder 16, selector 20 and AMP 21. In this way, the music recorded in the CD output from the speaker 22.

Next, the CPU 11 controls the graphic controller 26 and the display controller 24 to display the output operation mode such as "CD is being reproduced", "FM broadcasting", etc. according to the output operation mode set as described above (step 104).

The CPU 11 determines whether or not a user designates the operation of ejecting the CD or the operation of opening the operation/display panel 2 through the operation keys 4 or touch panel on the LCD display portion 3 during the automated recording (step 105). If the ejecting operation or the panel opening operation is performed during the automated recording, the CPU 11 controls the graphic controller 26 and the display controller 24 to display message indicating that the recording is not still completed on the LCD display portion 3 as shown in FIG. 4, thereby informing a user that the recording is now being performed (step 106).

On the other hand, CD previously digitally stores music signals in a programming area for each track and TOC (Table of Contents) information such as information indicating a position of each track in a lead-in area. During CD reproduction, the CPU 11 first reads and stores the TOC information in the RAM 13. The TOC information contains numbers of respective pieces of music in the CD and their playing times. The CPU 11, therefore, calculates the remaining playing time and the recording-completed music number when the ejecting operation is performed, thereby displaying them on the screen indicating "recording not-completed", as shown in FIG. 4. On this screen, the CPU 11 also displays icons "YES" and "NO" for allowing a user to select whether or not the automated recording is interrupted.

Next, the CPU 11 determines which "YES" or "NO" has been depressed on this screen (step 107). When a user depresses "YES" on this screen, the CPU 11 interrupts the automated recording (step 108), and then the operation/display panel 2 is opened and the CD is ejected (step 109). Thereafter, the program is terminated. When a user depresses "NO" on the screen indicating "recording not-completed", the CPU 11 returns to step 105, and then the automated recording is continued.

On the other hand, in step 105, if the CPU 11 determines that the ejecting operation or the panel opening operation has not been performed, the CPU 11 further determines whether or not sound skip (data skip) has occurred (Step 110). The CPU 11 always checks the data number (address) of the CD data that is being reproduced by the CD-ROM drive 17. When the data number has greatly changed, the CPU 11 determines that the sound skip has occurred. In this case, the CPU 11 controls the graphic controller 26 and the display controller 24 to display a message indicating the occurrence of the sound skip and icons for selecting the recording interruption (step 111).

The CPU 11 determines which icon "YES" or "NO" has been depressed on this screen (step 112). When a user depresses "YES" on this screen, the CPU 11 interrupts the automated recording (step 113), and then the operation/display panel 2 is opened and CD is ejected (step 109). Thereafter, the program is terminated. When a user depresses "NO" on this screen, the CPU 11 returns to step 105.

In step 110, if the CPU 11 determines that the sound skip has not occurred, the CPU 11 further determines whether or not the recording has been completed (step 114). If not completed (NO), the CPU 11 returns to step 105. If completed (YES), the CPU 11 opens the operation/display panel 2 and ejects CD (step 109). Thereafter, the program is terminated.

As described above, in the case where the ejecting operation or the panel opening operation is performed during the automated recording of the music information of CD, a user is reminded that the recording is being performed. Therefore, the recording interruption against the user's will can be prevented. Also in the case where the sound skip occurs, user's attention is called. Therefore, the automated recording accompanied with sound skip can be prevented.

In the embodiment described above, the example is explained where the audio output mode for the automated recording can be selected. However, the function of selecting the audio output mode may not be given. Namely, during the automated recording, audio being output at that time can be continuously output without outputting reproduced audio of the recording medium.

In the embodiment described above, when the ejecting operation has been performed or the sound skip has occurred during the automated recording, the message for calling the user's attention is displayed on the LCD display portion 3. However, the audio apparatus may inform the user of the fact that the recording being performed or the occurrence of the sound skip by voice.

Further, in the embodiment described above, the audio apparatus according to the invention is applied to the car navigation device. However, the invention can be applied to an ordinary audio apparatus equipped with a CD player and MD player. Further, the invention can also be applied to an audio apparatus equipped with the CD player alone or the MD player alone.

Further, in the embodiment described above, music information of CD is recorded in the HD. However, the invention can be applied to a case where music information is automatically recorded from various recording media into various storage devices other than HD. The invention can be applied to a case where information contained in a recording medium includes various information such as music and an image.

What is claimed is:

1. An information recording/reproducing apparatus comprising:
   a reproduction unit that reads information recorded in a recording medium;
   an operation unit that instructs the reproduction unit to eject the recording medium;
   a storage unit that stores the information read by the reproduction unit therein;
   a reception unit that receives external information from external;
   a speaker;
   a control unit, wherein:
      when the recording medium is loaded into the reproduction unit, the control unit controls the reproduction unit to read the information and controls the storage unit to store the information read by the reproduction unit therein automatically; and
      when the operation unit instructs the reproduction unit to eject the recording medium during the storage unit being storing the information read, the control unit informs a user that the storage unit is storing the information read; and
   a selection unit that selects one of:
      (a) a first mode in which when the recording medium is loaded into the reproduction unit and the speaker outputs audio other than the information recorded in the recording medium, the control unit keeps the speaker outputting the audio; and
      (b) a second mode in which when the recording medium is loaded into the reproduction unit and the speaker outputs audio other than the information recorded in the recording medium, the control unit changes the audio output from the speaker to the information read.

2. The apparatus according to claim 1, wherein the control unit controls the reproduction unit, the operation unit, and the storage unit.

3. The apparatus according to claim 1, further comprising:
   a display, wherein:

when the operation unit instructs the reproduction unit to eject the recording medium while the storage unit is storing the information read, the control unit displays on the display a message indicating that the storage medium is storing the information read.

4. The apparatus according to claim 3, wherein:
when the control unit displays the message on the display, the control unit allows the user to select whether or not the user interrupts the storing of the information read.

5. The apparatus according to claim 3, wherein:
when the operation unit instructs the reproduction unit to eject the recording medium while the storage unit is storing the information read, the control unit displays a time relating to storage completion on the display.

6. The apparatus according to claim 3, wherein:
when the operation unit instructs the reproduction unit to eject the recording medium while the storage unit is storing the information read, the control unit displays which part of the information recorded in the recording medium has been stored in the storage unit on the display.

7. The apparatus according to claim 3, wherein:
when the operation unit instructs the reproduction unit to eject the recording medium while the storage unit is storing the information read, the control unit displays attribute information of the information, which has been stored in the storage unit, on the display.

8. The apparatus according to claim 1, wherein:
when the operation unit instructs the reproduction unit to eject the recording medium while the storage unit is storing the information read, the control unit informs the user that the storage medium is storing the information read, by audio from the speaker.

9. The apparatus according to claim 1, wherein:
the control unit checks whether or not data skip occurs while the storage unit is storing the information read; and
when the control unit detects the data skip, the control unit informs the user of the occurrence of the data skip.

10. The apparatus according to claim 9, further comprising:
a display, wherein:
when the control unit detects the data skip, the control unit displays a message indicating the occurrence of the data skip on the display and allows the user to select whether or not the user interrupts the storing of the information read.

11. The apparatus according to claim 1, further comprising:
a display, wherein:
the operation unit includes a touch panel displayed on the display; and
when the operation unit instructs the reproduction unit to eject the recording medium, the control unit opens the display so that an insertion port of the reproduction unit is exposed to outside.

12. The apparatus according to claim 11, wherein the apparatus forms a part of a car navigation apparatus.

13. The apparatus according to claim 1, wherein when the storage unit completes the storing of the information read, the control unit ejects the recording medium from the reproduction unit automatically.

14. The apparatus according to claim 1, wherein when an error occurs while the storage unit is storing the information read, the control unit notifies the occurrence of the error.

15. An information recording/reproducing apparatus comprising:
an operation/display panel;
a reproduction unit into which a recording medium is loadable when the operation/display panel is opened, the reproduction unit that reads information recorded in the recording medium;
a storage unit that stores the information read by the reproduction unit;
a reception unit that receives external information from external;
a speaker;
a control unit, wherein:
when the recording medium is loaded into the reproduction unit, the control unit controls the reproduction unit to read the information and controls the storage unit to store the information read therein automatically; and
when an opening operation of the operation/display panel is performed during the storage unit being storing the information read, the control unit informs a user that the storage unit is storing the information read; and
a selection unit that selects one of:
(a) a first mode in which when the recording medium is loaded into the reproduction unit and the speaker outputs audio other than the information recorded in the recording medium, the control unit keeps the speaker outputting the audio, and
(b) a second mode in which when the recording medium is loaded into the reproduction unit and the speaker outputs audio other than the information recorded in the recording medium, the control unit changes the audio output from the speaker to the information read.

16. The apparatus according to claim 15, wherein the control unit controls the reproduction unit, the operation/display panel, and the storage unit.

17. The apparatus according to claim 15, wherein:
the operation/display panel includes a display; and
when the opening operation of the operation/display panel is performed while the storage unit is storing the information read, the control unit displays on the display a message indicating that the storage medium is storing the information read.

18. The apparatus according to claim 17, wherein:
when the opening operation of the operation/display panel is performed while the storage unit is storing the information read, the control unit displays time to storage completion on the display.

19. The apparatus according to claim 17, wherein:
when the opening operation of the operation/display panel is performed while the storage unit is storing the information read, the control unit displays which part of the information recorded in the recording medium has been stored in the storage unit on the display.

20. The apparatus according to claim 17, wherein:
when the opening operation of the operation/display panel is performed while the storage unit is storing the information read, the control unit displays attribute information of the information, which has been stored in the storage unit, on the display.

21. An information recording/reproducing apparatus comprising:
a reproduction unit that reads information recorded in a recording medium;
a storage unit that stores the information read by the reproduction unit therein;
an audio output unit that outputs audio;
a control unit;

a reception unit that receives external information from external; and a selection unit, wherein:

when the recording medium is loaded into the reproduction unit, the control unit controls the reproduction unit to read the information and controls the storage unit to store the information read therein automatically;

the audio output unit is able to output the external information received; and the selection unit selects one of:

(a) a first mode in which when the recording medium is loaded into the reproduction unit and the audio output unit outputs audio other than the information recorded in the recording medium, the control unit controls the storage unit to begin storing the information read without changing the audio output from the audio output unit; and (b) a second mode in which when the recording medium is loaded into the reproduction unit and the audio output unit outputs audio other than the information recorded in the recording medium, the control unit changes the audio output from the audio output unit to the information read.

* * * * *